United States Patent
Caouette

(10) Patent No.: US 8,706,330 B2
(45) Date of Patent: Apr. 22, 2014

(54) ELECTRONIC SYSTEM AND METHOD OF AUTOMATING, CONTROLLING, AND OPTIMIZING THE OPERATION OF ONE OR MORE ENERGY STORAGE UNITS AND A COMBINED SERIAL AND PARALLEL HYBRID MARINE PROPULSION SYSTEM

(75) Inventor: Pierre Caouette, Hallandale, FL (US)

(73) Assignee: Hybrid Innovation Technologies LLC, Dania Beach, FL (US)

( * ) Notice: Subject to any disclaimer, the term of this patent is extended or adjusted under 35 U.S.C. 154(b) by 0 days.

(21) Appl. No.: 13/340,107

(22) Filed: Dec. 29, 2011

(65) Prior Publication Data

US 2012/0101671 A1    Apr. 26, 2012

Related U.S. Application Data

(63) Continuation-in-part of application No. 12/612,383, filed on Nov. 4, 2009.

(60) Provisional application No. 61/427,903, filed on Dec. 29, 2010.

(30) Foreign Application Priority Data

Nov. 14, 2008    (CA) ..................................... 2643878

(51) Int. Cl.
| | | |
|---|---|---|
| *B60L 3/00* | (2006.01) | |
| *B60L 15/00* | (2006.01) | |
| *G05D 1/00* | (2006.01) | |
| *G05D 3/00* | (2006.01) | |
| *G06F 7/00* | (2006.01) | |
| *G06F 17/00* | (2006.01) | |
| *B60L 11/00* | (2006.01) | |
| *B63H 21/17* | (2006.01) | |

(52) U.S. Cl.
USPC ................................................ 701/21; 440/6

(58) Field of Classification Search
USPC ............................................. 701/21; 440/1, 6
See application file for complete search history.

(56) References Cited

U.S. PATENT DOCUMENTS

| | | | |
|---|---|---|---|
| 6,857,918 B1* | 2/2005 | Lebreux et al. | 440/6 |
| 8,298,025 B2* | 10/2012 | Eichinger | 440/88 C |
| 2006/0025025 A1* | 2/2006 | Kitani et al. | 440/6 |
| 2006/0213697 A1* | 9/2006 | Sutherland | 180/2.2 |
| 2008/0064273 A1* | 3/2008 | Mizokawa | 440/1 |
| 2008/0182466 A1* | 7/2008 | Wegner-Donnelly et al. | 440/84 |
| 2008/0315583 A1* | 12/2008 | Beck et al. | 290/31 |
| 2010/0094490 A1* | 4/2010 | Alston et al. | 701/21 |

FOREIGN PATENT DOCUMENTS

| | | |
|---|---|---|
| EP | 0759370 A2 | 2/1997 |
| WO | 9740999 A1 | 11/1997 |
| WO | 2006/099318 A1 | 9/2006 |
| WO | 2008/113999 A1 | 9/2008 |

* cited by examiner

*Primary Examiner* — Thomas Tarcza
*Assistant Examiner* — Imran Mustafa
(74) *Attorney, Agent, or Firm* — Knobbe, Martens, Olson & Bear, LLP

(57) ABSTRACT

A method of integrating, optimizing and combining in a marine hybrid system, the operation of one or more variable speed high voltage direct current (HVDC) generator(s), one or more energy storage units and a combination of one or more HVDC parallel hybrid and serial hybrid propulsion systems through use of an Energy Management Computer. One aspect of the invention involves the application of logic programming to automate the optimization and the operation of the Internal Combustion Engines (ICE) so that whenever the system requires their usage, they are operated at optimum efficiency conditions. For an ICE to operate at peak efficiency a combination of a large energy storage unit used as a buffer combined with a mixture of both a serial and a parallel hybrid system is used.

9 Claims, 8 Drawing Sheets

ELECTRONIC SYSTEM AND METHOD OF AUTOMATING, CONTROLLING, AND OPTIMIZING THE OPERATION OF ONE OR MORE ENERGY STORAGE UNITS AND A COMBINED SERIAL AND PARALLEL HYBRID MARINE PROPULSION SYSTEM

CROSS-REFERENCE TO RELATED APPLICATION

This application is related to and claims priority to U.S. Provisional Application Ser. No. 61/427,903, filed Dec. 29, 2010, entitled ELECTRONIC SYSTEM AND METHOD OF AUTOMATING, CONTROLLING, AND OPTIMIZING THE OPERATION OF ONE OR MORE ENERGY STORAGE UNITS AND A COMBINED SERIAL AND PARALLEL HYBRID MARINE PROPULSION SYSTEM, the entirety of which is incorporated herein by reference, and is a Continuation-in-Part application of co-pending U.S. application Ser. No. 12/612,383, filed Nov. 4, 2009, entitled ELECTRONIC METHOD OF CONTROLLING PROPULSION AND REGENERATION FOR ELECTRICS, HYBRID-ELECTRIC AND DIESEL-ELECTRIC MARINE CRAFTS, AND AN APPARATUS THEREFOR, which claims priority to Canadian Patent Application No. 2,643,878, filed Nov. 14, 2008, the entirety of all of which are incorporated herein by reference.

STATEMENT REGARDING FEDERALLY SPONSORED RESEARCH OR DEVELOPMENT n/a

FIELD OF THE INVENTION

The invention generally relates to marine electric propulsion systems. Specifically, the invention relates to the definition, programming and parameterization of an electronic management computer to interface, integrate, optimize, automate and simplify the operation of a combination of serial and parallel marine hybrid electric propulsion systems.

BACKGROUND OF THE INVENTION

One of the novelties of the invention is to utilize automation to restrict the use of an ICE (Internal Combustion Engine) to when it can be operated at near optimum efficiency by combining electrical storage with a parallel and a serial marine hybrid electric propulsion system in a marine vessel.

To help understand marine hybrid propulsion, we may quickly define the different systems that we are going to refer to. Diesel electric may be defined as a system where a generator is required for propulsion and its electrical power output is directly connected to the propulsion electric motors. In a serial hybrid system, a large ESU (Energy Storage Unit) is placed between the generator and the loads; the energy storage unit is used as a buffer and also for electric only operation when low power is required. In a parallel hybrid system, the ICE is directly connected to the propulsion shaft through a clutch and reduction gear and it is furthermore connected to an electric motor/generator.

We can understand the inherent inefficiencies of strictly diesel electric propulsion systems. When the house loads are less than the propulsion loads or the installation does not require multiple generators, the multiple power conversions make this technology quite inefficient. The inefficiency of diesel electric is why newer installations tend to adopt either parallel or serial hybrid by making an energy storage unit part of the system.

On the other side of the spectrum, where in very high power requirements the ICE is being used past its most efficient area, the electric motor of the associated parallel hybrid system can also be utilized through the energy storage unit to assist in providing thrust, but for a limited time. Again, once the ESU reaches its low level, there is no solution but to reduce power. In certain weather conditions, reducing power is not desired, and could even be dangerous. Therefore, the problem with parallel hybrid is that it is inefficient at very high power or at low power when the batteries are depleted.

Like parallel hybrids, use of serial hybrids may also result in problem areas. For example, the problem here lies in that at normal continuous power, even though the engine is running at the most efficient area, the combined losses of generating and using would be more than 10% worse than a good parallel system operating in the same optimum range, even assuming that the ESU battery was 100% efficient.

Also, as far as house loads are involved, the use of an ESU being pulsed by an efficient ICE can reduce its operating time and greatly improve the efficiency of generating and maintaining large house loads. Current practice on most yachts is to use fixed speed AC (Alternative Current) generators, designed for peak loads, the AC current produced is not directly compatible with an ESU that is DC (Direct Current) by nature, and these generators must run almost continuously when house loads are high, such as use of air conditioning. Another major consideration is electric power production, whether it is from a standalone generator, a motor/generator coupled to a parallel hybrid system, fuel cells, wind/water generator or solar panels. Fuel is still the best way (in terms of volume/weight) to store energy and until the price of fossil fuels increase dramatically, and as long as extended range navigation or some form of shore power independence is required, fuel will still be used. With this in mind, the best way to convert this fuel into electric (or propulsion) power is to use high efficiency variable speed diesel HVDC generators, as long as they are being used in their best RPM and torque window for the load. By cycling the generator into an ESU and providing variable house loads through HV high efficiency inverters, operational saving of up to 70% can be achieved on a yearly basis compared to old technology fixed speed AC generators.

In certain vessels where an old technology AC generators are already installed or the need for a low cost emergency backup power is needed, an existing AC fixed speed generator can still be used by redirecting its output to the HVDC shore power charging system of the vessel, thereby providing a power source for the HVDC systems. Such a system can also be balanced so as to load the AC generator to its best operating point thereby avoiding the issues of wrong loading conditions.

To solve these issues, the present invention includes a system and method for use of both parallel and serial hybrid technologies in combination with an ESU, in order to optimize the operation of a modern hybrid electric marine vessel.

SUMMARY OF THE INVENTION

This invention relates to the automation and optimization of a complex hybrid system for marine vessels where a hardware unit with three mode (OFF, AUTO and ON) as stated in Patent application WO 2010/054466 A1 from the same inventor, together with throttle position, is used as a power management interface between complex and dissimilar boat systems and the operator, so as to ease the operation, increase safety, reduce the workload, increase comfort and greatly improve fuel efficiency. This involves the use of control software to integrate, optimize and combine in a marine hybrid system, the operation of one or more variable speed HVDC generator(s), one or more (ESU) and a combination of one or more HVDC parallel hybrid and serial hybrid propulsion systems. To further optimize efficiency, heuristic algorithms based on fuel consumption versus kW produced at different loads and RPM are used. Once an energy storage unit is coupled to an electric motor and to an ICE, a complete 3D map is produced describing the efficiency of each device by measuring the actual kW produced for every gram of fuel at different RPM and torque over the whole power range for each of these devices. This information and the energy storage characteristics are then used by the software to determine which is the best device(s) to use, single or in combination, for the action to be performed. All of this based solely on simple thrust lever commands and one of the 3 modes (OFF, AUTO and ON) selected by the operator as described in WO 2010/054466.

While the limitations of diesel, electric only, diesel electric, serial hybrid and parallel hybrid are well known, each of those has strong points and each has its disadvantages. The present invention incorporates these disparate technologies and merges them into a unified computer controlled system, with the role of automatically optimizing these technologies in a transparent fashion for the vessel operator and thus drastically increasing their combined efficiencies in accordance with the punctual loads demanded. For example, low power maneuvering and movement up to hull speed for a limited time is accomplished purely under electric. In one embodiment, (See FIG. 1) should the ESU get down to the lower limits, the generator automatically starts, and runs at peak efficiency to recharge the ESU and shuts down once the upper ESU limits is reached (FIG. 5). Should the demands of propulsion increase to a point that is close to the peak efficiencies of the variable speed DC generator, the generator may start again (FIG. 6), and provide power to all loads until the demands decrease. If power requirements for propulsion continue to increase, then the parallel engine(s) may start (FIG. 7), synchronize, a clutch/transmission may connect it to its associated propeller and electric motor/generator (FIG. 1), this electric motor/generator may change function from propulsion to generation and its power may then be used to power other electric propulsion motor(s) and loads. At this point the generator may shut down. In the final portion, should maximum power be required, the generator would be automatically restarted and combined to all loads to provide a mixture of parallel and serial hybrid power to all of the vessels loads, irrespective of their nature, in a completely transparent fashion for the vessel operator. It is worth mentioning that the operator has very little knowledge of all of this optimized switching, as the transitions in power demands are met by using the Energy Storage Unit and the electric motors. In this example, up to a momentary 100 kW/h of energy can be extracted from or pushed back into the ESU, to smooth out and optimize the transitions.

Propeller sizing is also important to consider in a mixed configuration. Electric motors have inherently very high torque even at very low rpm due to the nature of the technology. ICEs on the other hand have very low power at low rpm and thus the propellers are designed so that they do not stall the engine at low speed. This compromise is very costly in terms of efficiency. On the other hand of the spectrum, due to the logarithmic nature of drag increase with speed, ICE engines are normally sized for the maximum propeller loads and are therefore ill suited for low power utilization. Maximum propeller load is normally not the most fuel efficient area of utilization of an ICE either. By combining an electric motor and an ICE, the very low power setting can be accomplished by the electric motor allowing a propeller to be pitched and surfaced to the most efficient point of the ICE. It is also understood that at very high power, the ICE might not be able to achieve its top RPM because of the high pitch and surface of an optimized propeller, but there again the coupled electric motor can be of assistance in enabling the ICE to stay in its efficient area and still have the vessel achieve its expected performance (FIG. 8).

In accordance with one embodiment of the present invention, the system includes a hybrid EMC (Energy Management Computer) system. The EMC includes a human actuable input device, the human actuable input device selecting one of a plurality of operating modes. An ESU (Energy Storage Unit) is further included, the ESU having a corresponding charge level. A generator is included, the generator selectively supplying at least one of house power, propulsion power and ESU recharge power based at least in part on the selected one of the plurality of operating modes. An electric motor is included, the electric motor operating in an electric generation mode to generate electric power and as motor in a propulsion mode to turn a propeller. A prime mover ICE (internal Combustion Engine) is included, the prime mover ICE is controlled to turn the propeller and to drive the electric motor to generate the electric power when the electric motor is in the electric generation mode. An EMC is included, the EMC having a processor controlling the operation of the prime mover internal combustion engine, the generator and the electric motor based at least in part on the selected operating mode, the ESU charge level, a house load demand and a propulsion demand.

In another embodiment, a method includes receiving a selected one of a plurality of operating modes. Using a generator to selectively supplying at least one of house power, propulsion power and ESU recharge power based at least in part on the selected one of the plurality of operating modes. Operating an electric motor in an electric generation mode to generate electric power and as motor in a propulsion mode to turn a propeller. Controlling the operation of a prime mover ICE, the generator and the electric motor based at least in part on the selected operating mode, the ESU charge level, a house load demand and a propulsion demand. The prime mover ICE being controllable to turn the propeller and to drive the electric motor to generate the electric power when the electric motor is in the electric generation mode.

In yet another embodiment, the system includes an ESU, a prime mover ICE, an electric motor, and a generator cooperating in both a serial and a parallel hybrid configuration to provide power to turn a propeller coupled to the marine vessel. An EMC controlling the ESU, the prime mover ICE, the electric motor, and the generator, the EMC automatically switching between providing power to the propeller in the serial configuration and the parallel hybrid configurations.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Figure 1:
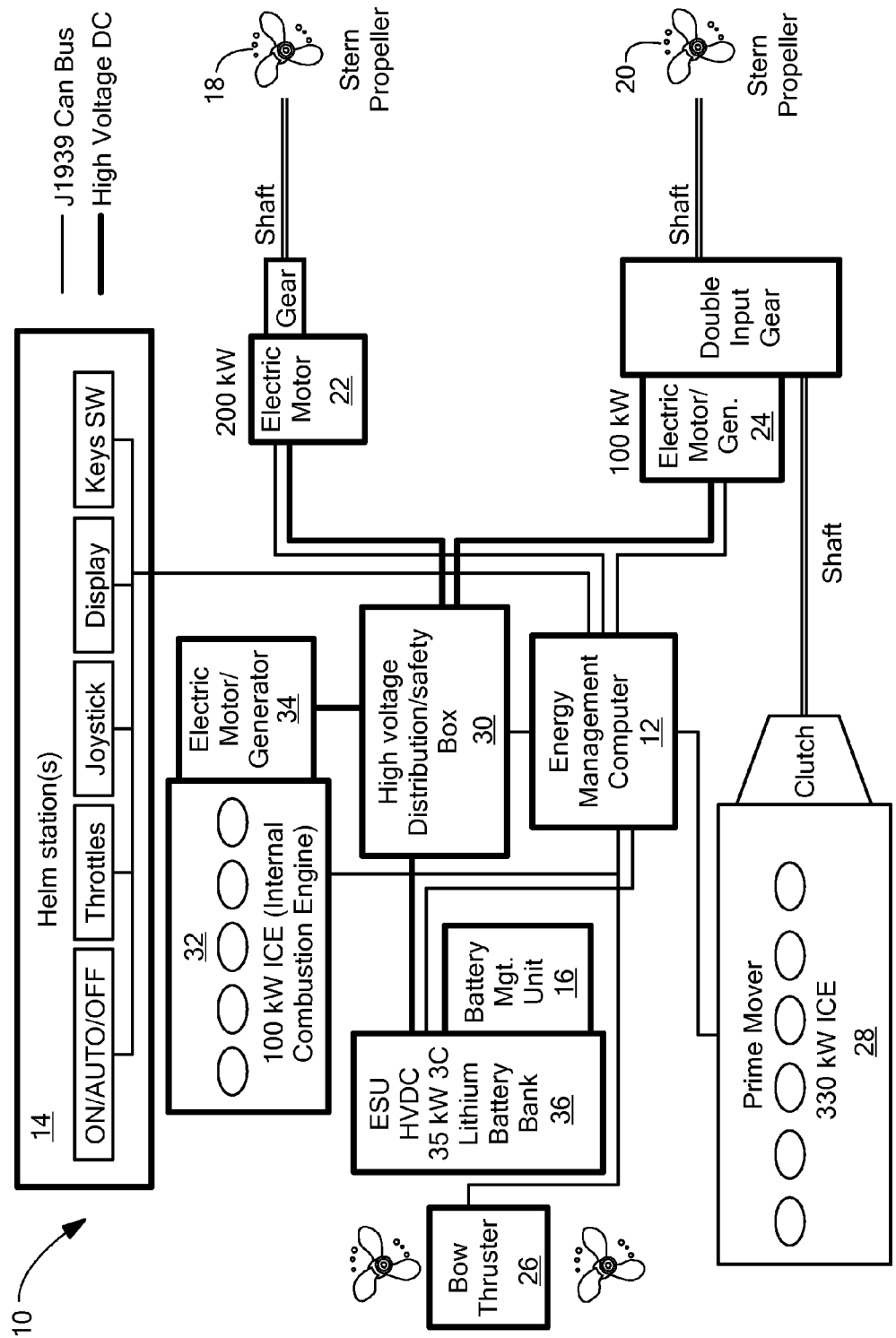
FIG. 1 is a simplified schematic view of an embodiment of a combined serial and parallel hybrid system for a marine vessel constructed according to the principles of the present invention.

If petroleum based products are to be used, the most efficient way to provide propulsion is through an advanced common-rail diesel engine directly connected to a propeller via a proper gear reduction ratio and with a propeller sized and pitched to provide the right load. Regretfully, this is not often the case.

Fixed speed AC generators used for house loads have a very high operating cost for the power they provide. The best way to generate energy is through a state of the art common-rail variable speed diesel engine coupled to an advanced HVDC generator, whose energy is stored in a high voltage electric storage unit capable of accepting and releasing a large amount of power with very low losses. Variable daily power demands are met through an efficient HVAC inverter, this allows the generator to be run only at its best efficiency area and just a few minutes per day, if the energy storage unit is sized appropriately.

One of the advantages of using a state of the art HVDC permanent magnet motor/generators is the infinite possibilities of power extraction and generation, with the advanced of new high performance motor controllers (motor inverters), the most sophisticated devices may allow bi-directional power transfer and voltage up-scaling. This voltage up-scaling allows when in motor mode to keep the rated output of the motor even as the energy storage units depletes, and conversely may allow in generation mode to provide full voltage output back into the energy storage unit even at very low RPM.

Diesel electric propulsion is very inefficient by its nature (e.g. inherent losses in multiple power conversion). The operating benefits only start to show up on large vessels equipped with multiple generators and where house loads are sometimes higher than propulsion loads, (so the power has to be converted into electric anyway).

Parallel hybrid systems are normally recognized as the most efficient way to operate a marine vessel but the efficiency window is quite narrow. Serial hybrid are normally considered the most flexible, more expensive but less efficient than parallel hybrid in their narrow operating window.

Electric only operation is the most elegant, simple and economical, but until the energy storage issues are resolved, (cost and energy storage capacity), it may require recharging with a generator that uses petroleum products and/or with wind/water generators, solar panels or fuel cells. This rapidly increases the cost and complexity of this type of system.

Even if battery only electric propulsion is extremely efficient at low speed and for low speed maneuvering, a large part of the market still demands the capability to go at high speed (even if for limited time). Commercial, pleasure fishing and diving operators want to go at high speed to their temporary destination and revert to low speed for hours or days before coming back at high speed to offload their expensive and/or time sensitive cargo, so that they can do it all over again.

Therefore, a way to automate the combination of the current technologies and greatly increase efficiency at all speeds is needed. A transparent integration of the above can be achieved if proper automation is used, and it is possible in integrate all of these into a uniform and extremely efficient system. This invention is directed at such a system and its control and operation using state of the art components, electronics and logic.

The system of the present invention is programmed to operate efficiently in different modes for different situations, such as when at the dock and connected to shore power, or when at sea in OFF, AUTO or ON modes.

Now referring to FIG. 1, which shows an exemplary simplified embodiment of the combined serial and parallel hybrid system of the present invention referred to generally as "10." Large lines represent bi-directional high voltage DC power flow. The narrow lines represent the data communications lines between the EMC 12 and the different devices it controls via a processor. In this embodiment, the helm station controls 14 are the mechanism by which the operator interfaces and monitors the operation of the EMC 12. The helm station controls 14 (that can be duplicated in as many locations as required), is the interface that tells what may be the operating mode to function in (OFF, AUTO and ON) and how the EMC 12 is going to respond to the Throttles and Joystick inputs.

The OFF mode is described as the electric only mode, all low speed (up to hull speed for a limited time) maneuvering is done in pure electric mode where the EMC (12) has control of the (ESU) Energy Storage Unit 36 power, the two propellers 18, 20 via their connected electric motors 22, 24 and the bow thruster 26. Should low seed maneuvering be maintained for hours and the power selection is in OFF mode, a warning (both visual and audio) may be activated and load shedding may be initiated once the ESU 36 reaches a predetermined low limit, (normally 40% of capacity for AGMs and 20% for Lithium). A further example of automation programming in a low power OFF mode is if the yacht had been operating on the electric only mode (OFF), and wished to continue in electric only mode once the ESU 36 had reached the predetermined state to automatically switch to the generator set, which can include a generator internal combustion engine 32 and a generator 34 (referred to herein as "generator 32, 34"). This could happen, for example, if entering a port where diesel operation is not desirable. The system would provide a warning of low power, and then the operator would choose an override function. This would allow the yacht to continue to function in electric only mode (OFF) by shutting down all non-essential power from the house loads, including AC power in use, all on-board lights with the exception of navigation lights and computer systems.

The AUTO mode is the normal operating mode of the system. In automatic mode, the low speed maneuvering is done as stated in the OFF mode with the exception that once the low ESU (36) level is approached, the generator (32, 34) is automatically started to recharge the battery. If the vessel, due to a combination of higher propulsion or house loads maintains a ESU (36) discharge rate over a stable period (of approximately 5 minutes) that is close to the window of optimum generator operation, the generator may start and, once the ESU (36) has reached its 95% level, the variable speed generator (32, 34) may slow down to accommodate the loads until these loads are reduced below its optimum operating window, at which time the generator (32, 34) may be shut down until required again. In this example, this mode may accommodate up to a total of 100 kW of combined power requirement (propulsion and house loads).

If propulsion load demands go above the optimum windows of the generator (32, 34) for an extended period but do not increase dramatically, then the EMC 12 may start the prime mover 28 and once warmed-up may synchronize the speed, close the clutch or engage the transmission to drive directly the propeller 20 and in turn generate power using its accompanied electric motor/generator 24. Once accomplished and assuming that the power demands are less than 200 kW total (in this example), the generator (32, 34) may shut down. In this mode, the prime mover 28 provides up to 200 kW of power split between the two propellers, as some of the power extracted from the prime mover 28 through its attached motor/generator 24 may feed the house loads through the High Voltage Distribution Box 30 and the second propeller 18 through its connected electric motor 22. This mode provides the highest level of efficiency has the prime mover 28 loads a closely matched to the optimum operating window by using the attached electric motor/generator 24 in combination. This also allows for effective propeller usage as the vessel in long range fuel saving mode never ends-up having a propeller 18 water-mill with its associated drags. Should total power demands exceed 200 kW, the EMC 12 may order a restart of the generator 32, 34 and by combining all power sources 28, 32 may allow up to a combined 400 kW of propulsion power.

It is worth noting that all these transitions are accomplished by the EMC 12 logic, with the primary goals of being the most efficient at using each of the different power producing/storing devices 28, 32 and 36 and of being completely transparent to the operators. It is also important to mention that these transitions are accomplished in a smooth power transfer method by using the energy stored in the electrical storage unit 36 as a buffer and the capability of electric motors to exceed the continuous rated power limits to complement or supplement variable thrust loads while the configuration is changing.

The ON mode is what may be considered an abnormal mode, it is a mode that overrides most energy saving modes and starts all available power units 28, 32, a way to override the battery charging logic, and also a way to have instantaneous emergency power of up to 500 kW by combining the power of all engines, electric motors 18, 20 and the ESU 36. The emergency mode is described in WO 2010/054466, FIGS. 4, 5 and 6.

In this example of a combined serial and parallel hybrid system, the ICE generator 32, 34 is 100 kW. The serial electric propulsion motor 22 is 200 kW. The parallel ICE 28 is 330 kW and its associated parallel electric motors/generator 24 is 100 kW. So in the electric only OFF mode, a total of 100 kW (50 kW per propeller) is available due to the limitations of available power from the ESU 36. In serial hybrid electric AUTO state (36+32, 34), a total of 200 kW (100 kW per propeller) is available. In low power prime mover 28 AUTO state, a total power of 300 kW (150 kW per propeller) is available. In high power prime mover 28 AUTO state, by combining the generator 32, 34 and the prime mover 28 with its mechanically connected electric motor/generator 24 a total of 400 kW of power is available to both propellers 18, 20. In ON mode state, a total power of up to 500 kW could be attained by the automatic combination of all power producing devices 28, 24, 32, 34 and 36 for a period of a few minutes.

Figure 2:
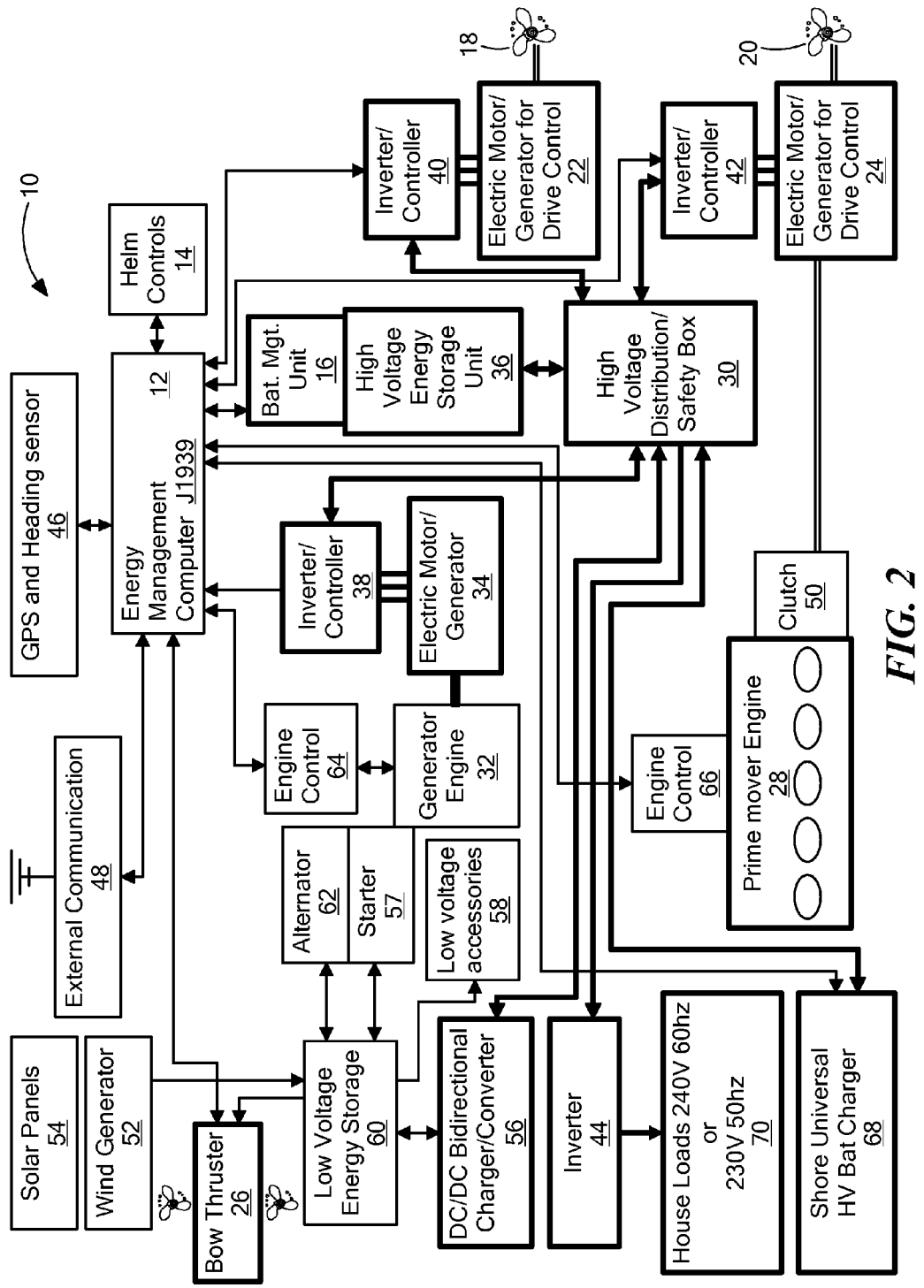
FIG. 2 is a detailed schematic view of the embodiment of the combined serial and parallel hybrid system shown in FIG. 1.

Now referring to FIG. 2, which shows a more detailed description of a mixed parallel, serial and electric hybrid system in accordance with one embodiment of the present invention. All controls 14 are (sail by wire) computer generated and all data communication amongst the peripherals managed by the EMC 12 and is done through CanBus, J1939, NMEA 2000 and/or EtherCan to name a few. All power management communications from the EMC 12 and any of the multiple peripherals, (Motor controllers 38, 40 and 42, User interfaces 14, Battery management system 16, HV switching 30, Inverters 44, Navigation information 46 and related equipment's is done through J1939, CanBus, NMEA 2000 and EtherCAN standard. All vessel operation passes through the Energy Management Computer 12, this one has been programmed to store historical data and as such also allow limited access through the external communication link 48, whether in the form of USB, Ethernet, Cellular, WiFi, Blue tooth or Satellite. This allows system monitoring, updating, alarms, status and certain functions to be performed remotely.

This exemplary embodiment has the following characteristics: A Parker MDL PLC is used as the EMC (Energy Management Computer) logic 12, a 35 kW/h 360VDC ESU (Energy Storage Unit) 36 rated at 3C (105 kW of power and approximately 28 kWh of energy). A 100 kW continuous variable speed DC generator 32, 34, a 200 kW/h electric drive motor 22 coupled to a propeller 18 and a parallel hybrid side 28, 50, 24 comprised of a 330 kW ICE (Internal Combustion Engine) 28 coupled to a clutch/transmission 50 and to a 100 kW electric motor/generator 24 attached to the propeller 20. A variable speed Can bus controlled bow 8 kW thruster 26 can be added. With the use of a joystick 14 full electronic control in forward, reverse, lateral and rotation axis can be done and if a reference to position and heading 46 is provided, automatic position hold can be implemented at each navigation station in a transparent basis, making low speed maneuvering in wind or current very easy and efficient. External Communication 48 and Helm Controls 14 were extensively discussed in described in WO 2010/054466. In keeping with the energy saving nature of this invention, should Wind Generator 52 or Solar Panels 54 be present, a DC/DC Bidirectional Charger/Converter 56 may allow any excess power to be redirected to the ESU 36.

The primary starting device for the Generator Engine 32 is the associated Electric Motor/Generator 34 through the ESU 36, this allow for a much faster spin-up before fuel is allowed to flow thereby increasing efficiency and minimizing operation at low RPM. Should there be a fault with the ESU 36 or EMC 12, the low voltage Starter 57 would be used for Generator 32 start instead. A lot of fuel is lost and pollution generated by starting and by low speed operation of a cold ICE. The inventor described an algorithm (in patent application WO 2010/054466 P29-32) that (in normal cases) starts the ICE 32 using its electric motor/generator 34. The idea is to spin the ICE 32 to operating speed before providing fuel for operation; this allows almost immediate high efficiency, eliminates start-up smoke and losses in low speed operation. Shut down includes a short period of temperature stabilization at lower speed before the complete shut-down takes place.

Since some of the Low Voltage accessories 58 are considered essentials (Energy Management Computer 12, for example), the limited size Low Voltage Energy Storage 60 would also get power from the Generator's Alternator 62 when this one is operating. The energy producing devices of this drawing 32, 28 are controlled by their own Engine Control Units 64, 66 and act as the communication interface (J1939) between them and the Energy Management Computer 12. The same function is achieved by the Inverter Controller 38, 40 and 42, their attached motor/generators and the EMC 12.

When shore power is available, it is connected through a universal high voltage battery charger 68 able to operate within a large range of frequencies and voltage making it worldwide compatible. This charger is also fully insulated (meaning there is no electrical link between the boat and dock power). Since all boat DC loads 58 are provided from a small LVDC battery 60 powered by HVDC/LVDC converters 56 and higher voltage AC loads 70 are provided through high efficiency HVDC/AC inverters 44, all powered from the ESU 36, the shore power loads can be monitored and adjusted through the main EMC 12 so as not to exceed the available shore power, since all peak boat demands are met by the ESU 36. Even a small 120V 10 Amps house plug is able to provide more than 25 kW of power per day, more than enough to run most small boats with intermittent high loads like water heaters, microwaves and other cooking appliances, as long as the peak loads are provided by a proper ESU 36 and its associated peripherals.

Another issue with advance automation is the (what if) scenarios: What happens if the EMC 12 device becomes unusable or if the ESU 36 becomes faulty? On large vessels, it is customary to have backup fail safe systems for the EMC 12, and the ESU 36 because of its higher stored power is usually divided in two parts, so having one of the two units fail has little effects on the operation. But on smaller vessels, a backup was needed. In case of serial hybrid system, an emergency mode can be activated when the EMC 12 is not operational, thereby turning the system into a strictly diesel-electric, by-passing all logic, automation and ESU 36, and having the propulsion respond directly to the attached generator. In the case of a parallel hybrid system, taking the EMC 12 offline allows the prime movers to be controlled directly by the related throttles, thereby bypassing the EMC 12 and controlling the engines directly.

Figure 3:
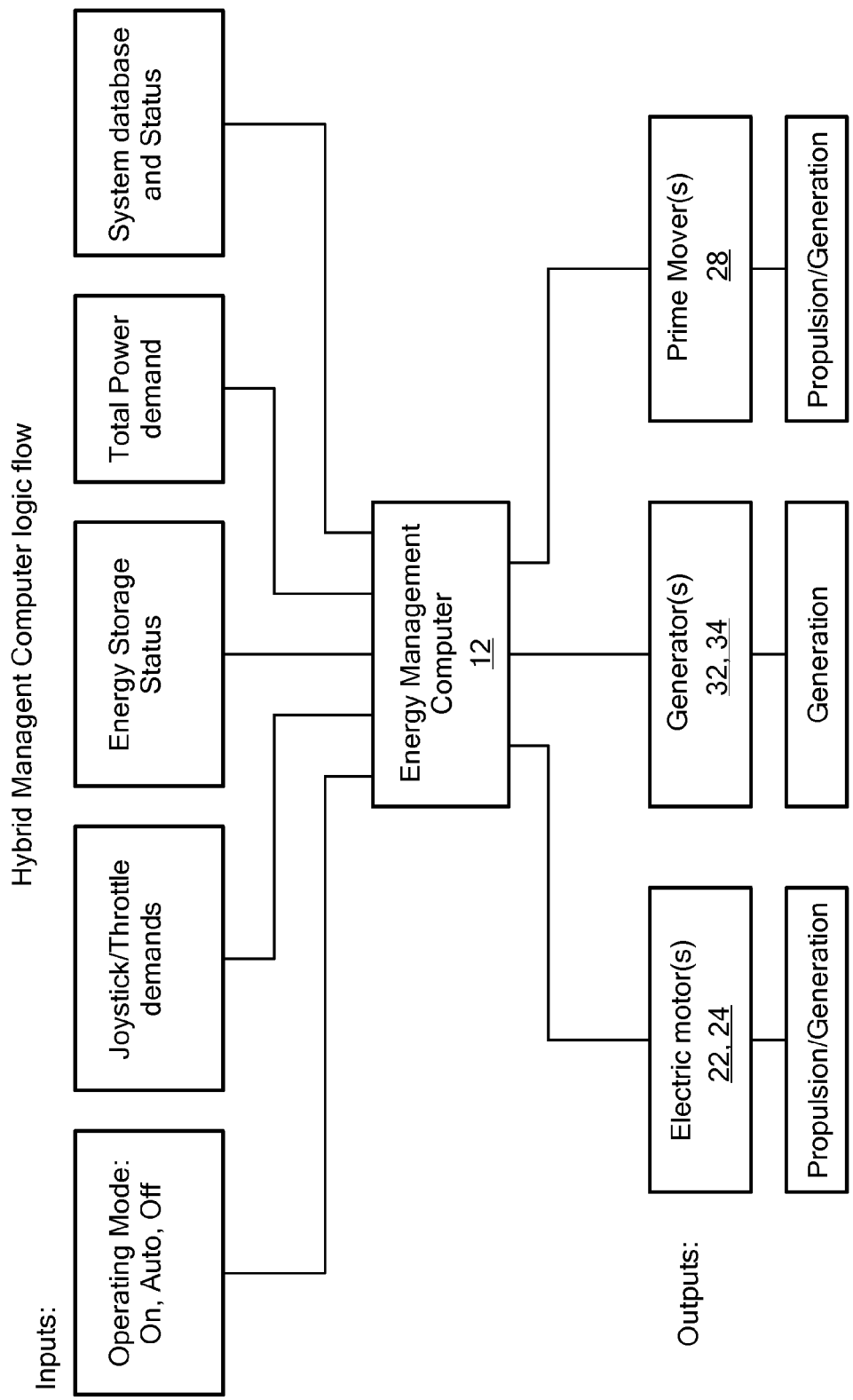
FIG. 3 is a flow chart of an exemplary operation of an energy management computer for the combined serial and parallel hybrid system for shown in FIG. 1 and constructed in accordance with the principles of the present invention. It shows the different inputs that affect its behavior and the devices that it controls.
Figure 4:
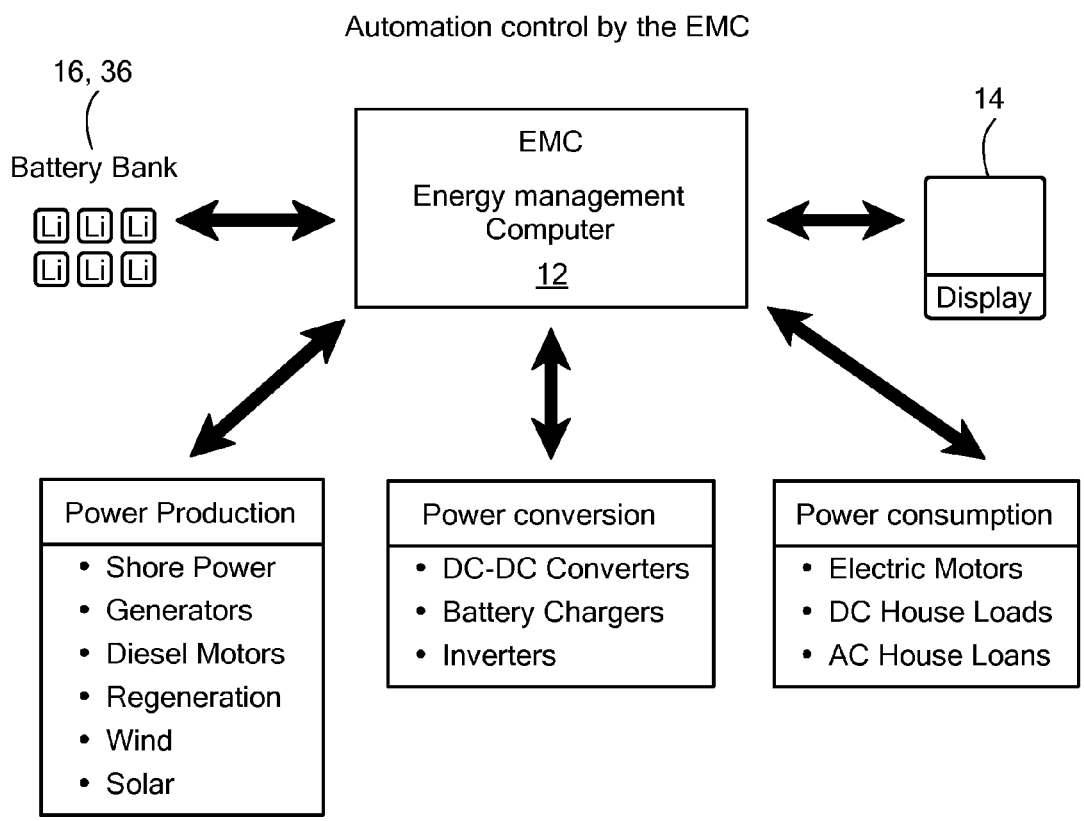
FIG. 4 is a schematic of an exemplary operation of the energy management computer shown in FIG. 3 controlling power production, power conversion and power consumption.

Now referring to FIG. 3, which shows an example of hybrid system energy management logic by the EMC 12. The simplified flow chart describes the different Inputs required by the EMC to do full system optimization and where is the logic Output going to. The EMC 12 continually monitors for status and demands changes from all the Inputs and coordinates the start/stop/demands to different outputs available in the vessel. Once propulsion has been activated in accordance with the operating mode (OFF, AUTO or ON), whether the input is from the joystick or the throttle(s), the system may activate the relevant output to move the vessel in accordance and transparently to the user. For example, FIG. 4 shows that the EMC 12 controls power production, power conversion and power consumption.

Figure 5:
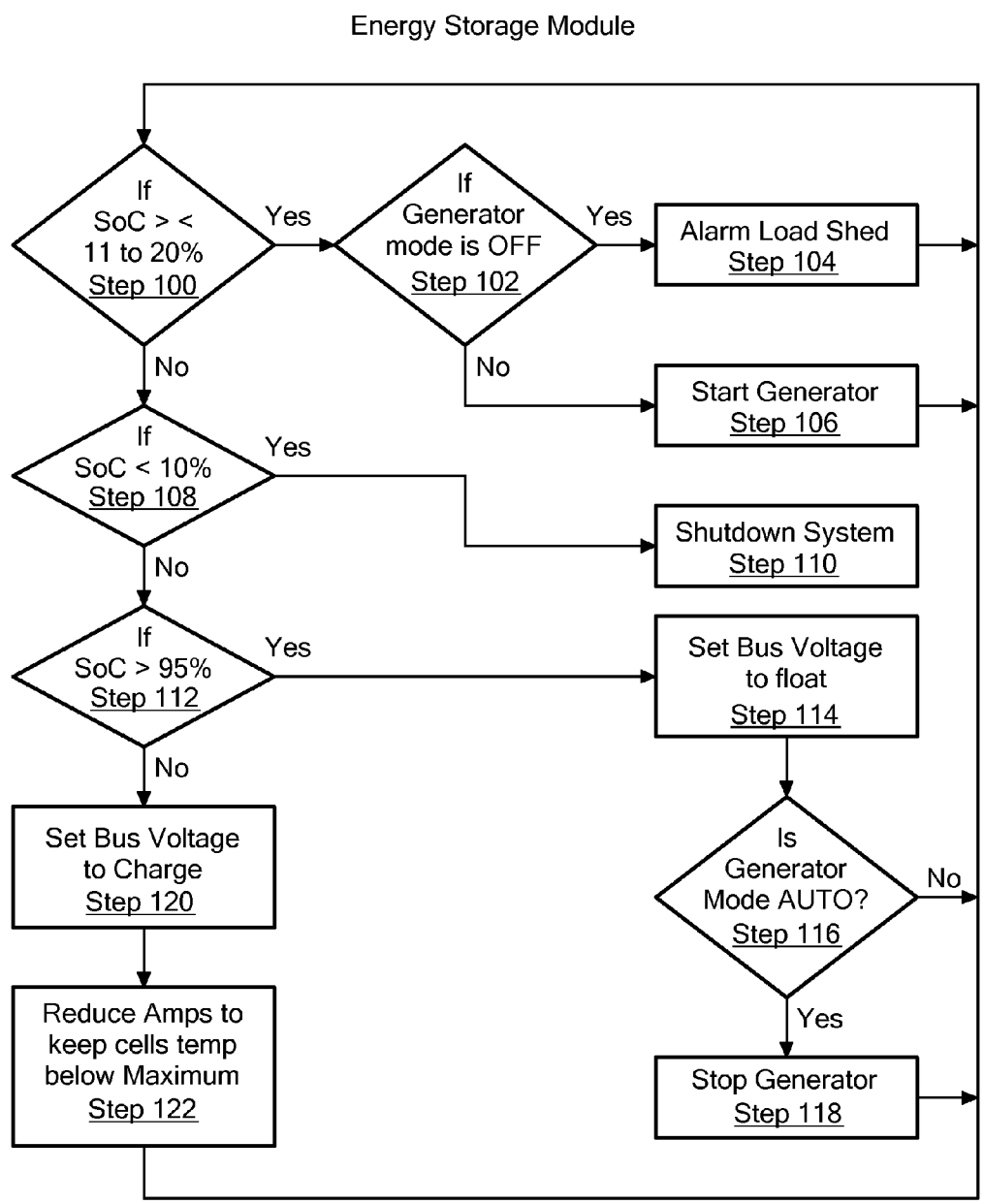
FIG. 5 is a flow chart showing an exemplary operation of an energy storage unit constructed in accordance with the principles of the present invention.

Now referring to FIG. 5, which shows the logic of the management (programmed in the EMC 12) of the ESU 36. Since propulsion always has priority, should low power storage limits be reached because of the selection of the mode (OFF) and the corresponding alarms be ignored, a load shedding algorithm would be enabled, some primary house loads would be maintained, but hot water heaters, air conditioning, normal power outlets would be shed in a progressive matter in order to maintain navigation, communication and propulsion for as long as possible. Should such an unusual power demand be put on the system, the EMC may record such action as it might affect manufacturer's warranty. In this embodiment, all energy storages units used in the system of the present invention (whether AGMs, Lithium or hyper-capacitors) have a minimum absorption and discharge rate of 3C (3 times their rated capacity), this means that a 33 kW/h battery bank can provide up to 100 kW of power in both charge and discharge actions. When Lithium batteries are cycled between 20% and 95% of charge, this mean that the effective energy that can be used and later replaced is in the order of 28 kWh. This power replacement is usually done in less than 30 minutes using a 100 kW HVDC generator, including the cool-off before shut down. A large and efficient battery bank and its associated management unit is of prime importance on any good hybrid application, especially on marine vessels where the propulsion loads are often replaced by fairly large and intermittent house loads.

In the case of house loads, since all house power is provided by the ESU 36 energy storage unit, any ICE used may be at optimum power (minimum fuel per kilowatt) to recharge the ESU 36 according to the charge window. The ESU 36 topping-up (100%) may be performed if propulsion loads demands that an ICE maintains operation or if the ON mode of operation is selected. This may be used to electrically synchronize and equalize the ESU through the BMU (16) up to full charge. This is also accomplished anytime the vessel is coupled to shore power.

In an exemplary operation of the ESU 36, the ESU 36 may operate based on stored limits and actual parameters provided by the Battery Management System 16, such as the state of charge (SoC) of the ESU 36. For example, if the SoC of the ESU 36 is between approximately 11-20%, meaning the charge remaining in the battery is approximately between 11-20% of its fully charged state (Step 100) and the OFF, AUTO and ON state of the Helm Control 14 is in the OFF (Step 102) configuration then the EMC 12 may shed non-essential loads and generate an alarm (Step 104) to advise the operator of the impeding low battery system deactivation, if on the other hand, the Helm Control 14 was in the AUTO configuration (Step 102), then the automatic generator start function (Step 106) would start the generator and charge the ESU 36. If the SoC was less than 10% (Step 108) and no operator action was performed to change the operating state from OFF to either AUTO or ON, then the EMC 12 would do an automatic system shutdown (Step 110) in order to protect the integrity of the system and allow a subsequent system re-start. If the SoC was not less than 20% and has not reached the upper limit then the EMC 12 considers the system to be in normal charge state, continue at charge voltage (Step 120) up to the 95% limit (Step 112) while monitoring the individual ESU 36 cellules voltages and temperatures provided by the BMS 16 and reducing charging Amperage as appropriate (Step 122). Now, for the third possibility, if SoC>95% (Step 120) then the EMC 12 may reduce the bus voltage to float level (Step 114) and verify the status of the mode status (AUTO or ON) (Step 116), If AUTO (the normal mode of operation) was active then the generator would be stopped (Step 118), if on the other hand the ON mode was active, the generator would continue its load following operating state. By cycling the generator 32 into the ESU 36 and providing variable house loads 70 through HV high efficiency inverters 44, operational saving of up to 70% can be achieved on a yearly basis compared to old technology fixed speed AC generators.

Continuing to refer to FIG. 5, in an exemplary embodiment where propulsion has priority over other system loads (Step 104), non-essential loads would be described but not limited to, hot water heaters, air conditioning, normal power outlets, stabilizers, non-essential lights in order to maintain navigation, communication and propulsion for as long as possible. Should such an unusual power demand be put on the system 10, the EMC 12 may record such action as it might affect manufacturer's warranty.

Figure 6:
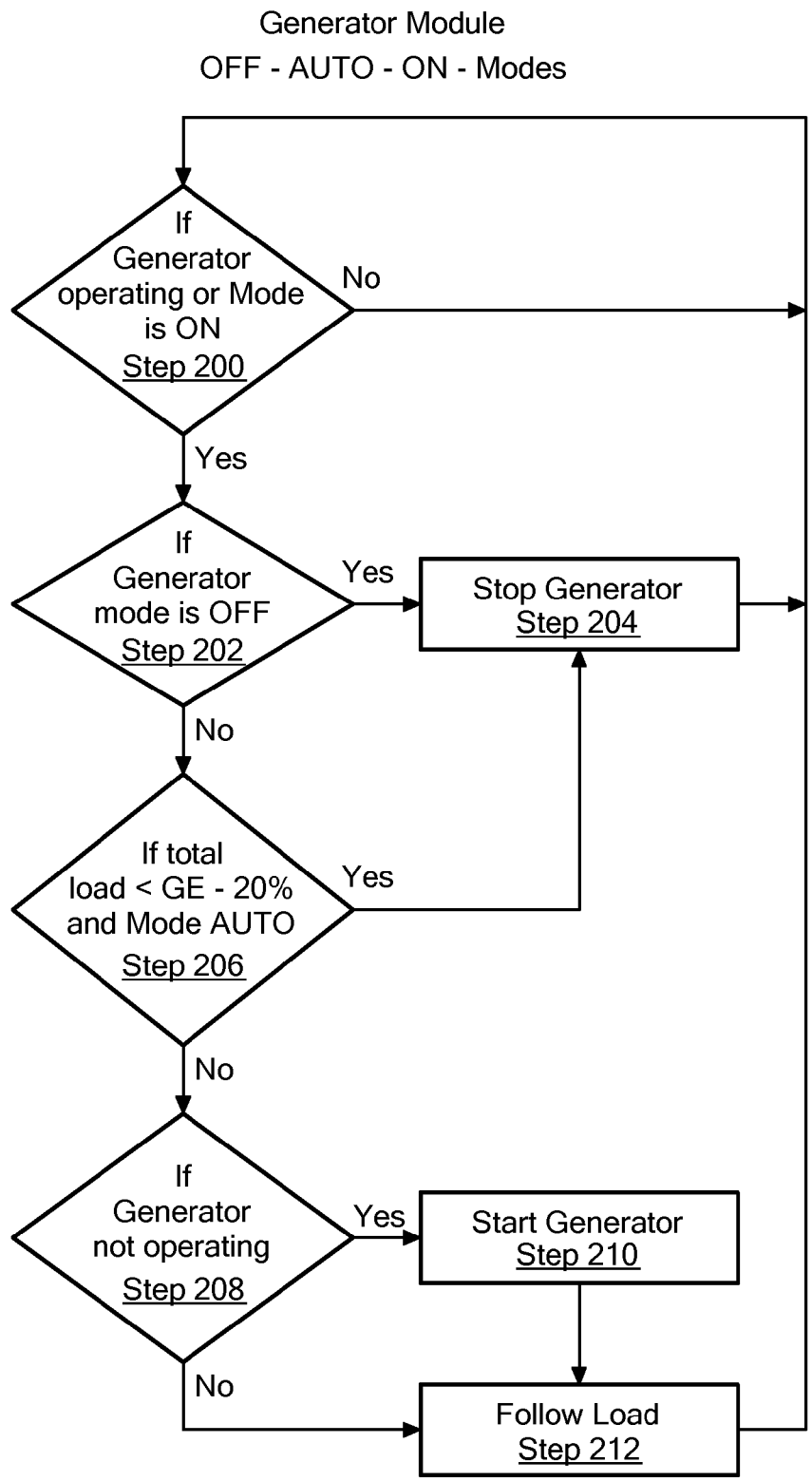
FIG. 6 is a flow chart showing an exemplary operation of a generator module constructed in accordance with the principles of the present invention.

Now referring to FIG. 6, which shows the logic of operation (programmed in the EMC 12) of the generator module, its relation to the helm station 14 (OFF, AUTO and ON) selection and the total vessel electrical loads (house and propulsion) as calculated by the EMC 12 and provided by the High Voltage Distribution and Safety Control Box 30. This module may respond immediately to changes in the mode selection (OFF, AUTO and ON) and has priority over the SoC module detailed in FIG. 5. This loop may also enable the operator to toggle the state of the charging system from charge to discharge. One good example is if the system is in charge state (AUTO and generator operating) and the operator knows that he may reach destination within the time frame allowed by the energy remaining status of the ESU 36, he might by momentarily selecting the OFF mode then switch back to AUTO mode put the system back in discharging state and make it to destination on electric only, where charging may be accomplished by shore power. The reverse is also true, if the operator may be reaching a destination where shore power may not be available and he wants to have a full ESU 36 upon arriving, should the system be in a partial discharge state (AUTO and generator not operating), by changing the status momentarily selecting the ON mode then switch back to AUTO mode, he would change the status of the generator module into charge state. Continue to refer to FIG. 6, this loop, (Generator Module) is also in charge of monitoring the total electrical loads provided by the High Voltage Box 30 to the EMC 12. Since on initial system calibration on a vessel first commissioning, a generator efficiency map is built in the EMC 12, it is also the role of this Generator Module to coordinate the operation of the generator according to the electrical loads of the system by verifying the elapse time, the amount of load and its location within the area of optimum efficiency of the generator. For example, if battery charging is not required yet, but the total system electrical loads are such that they fall within the optimum operating window of the generator, it then make sense to automatically start and operate the generator in a load following function, as the generator is already operating in its optimum operating window in accordance with the least amount of fuel per kW of power produced philosophy of this invention. By quickly following the logic diagram of FIG. 6, we see that if the generator is operating (Step 200) and the (OFF, AUTO and ON) mode is now in the OFF state (Step 202) then the generator should be stopped (Step 204). On the other hand if the mode is now in AUTO (Step 206) and the total systems loads are less than 20% of the generator most efficient point, then the generator should also be stopped (Step 204). The rest of the routine (Step 208) is where any load above the least efficient point may ask for a generator start (Step 210) and the standard load following with rpm (Step 212).

Figure 7:
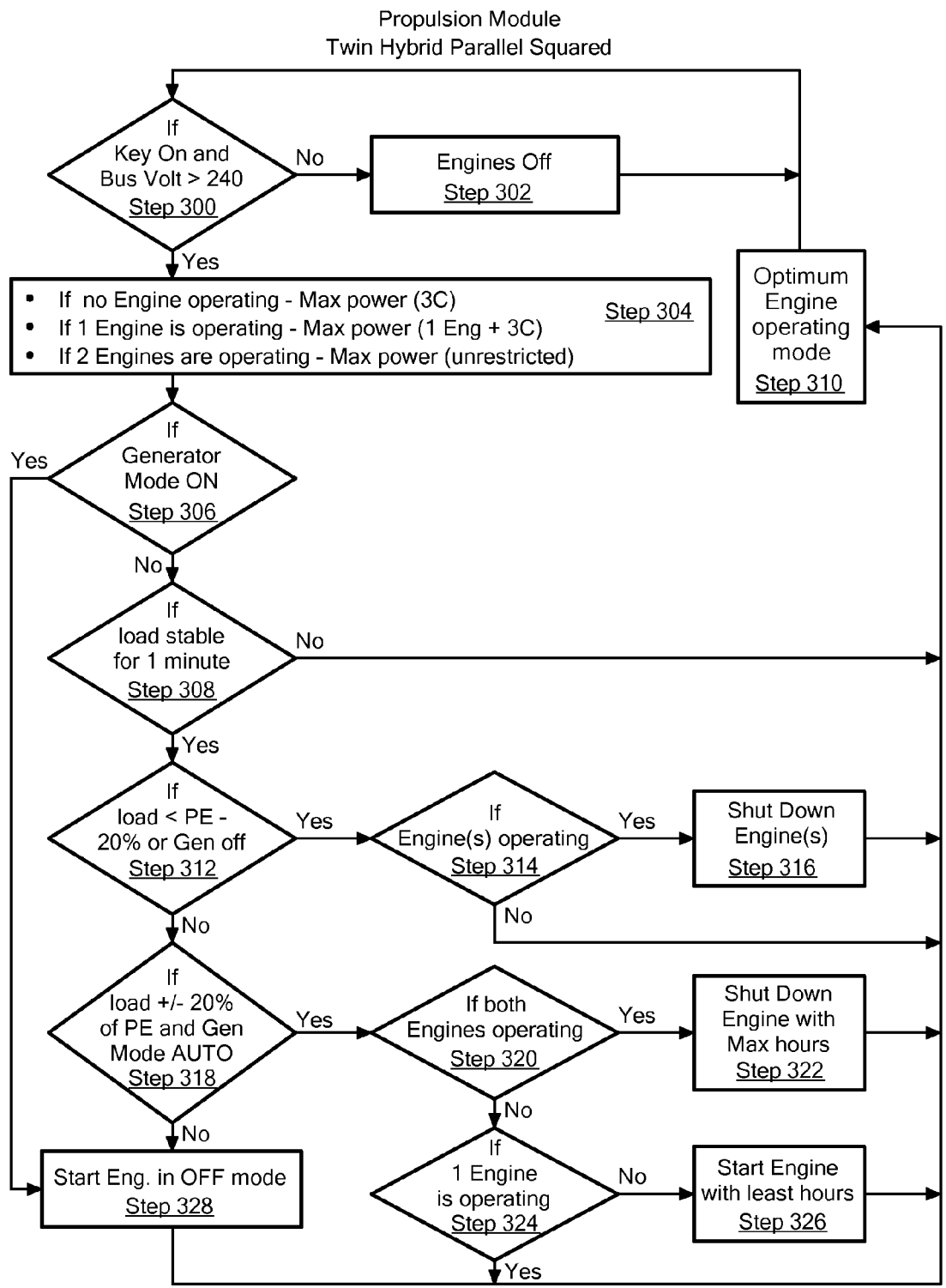
FIG. 7 is a flow chart showing an exemplary operation of a propulsion system in a twin hybrid parallel squared configuration constructed in accordance with the principles of the present invention.

Now referring to FIG. 7, which shows the logic of operation of the propulsion system in a Twin Hybrid Parallel Squared configuration. It is important to emphasize at this point that since the electric motors 22 and 24 are always either powering or generating, having a single engine operating does not prevent dual propellers from providing propulsion thereby allowing a significant reduction in drag on twin propeller vessels. It is also important to mention that according to this invention, system loads are the total of propulsion and house loads and are what is used to determine the best system to use to generate power, ESU 36, Generator(s) 32, 34 and/or Prime Mover(s) 28, and not necessarily just the speed of the vessel. For example, in an exemplary operation of at least one prime mover 28, the at least one prime mover 28 may have predetermined modes of operation based on whether the Helm Controls 14 is set to "OFF," "AUTO," or "ON," modes. These modes of operation are referred to herein as the "twin hybrid parallel squared" module. In large vessels, when (for high continuous power requirements) there is demand for very high boat speed, a twin engine prime mover might be the most cost effective, but even in this case, having a powerful generator and a large ESU 36 is still advantageous. The operation is just a little more complex. As described herein, one can see an example of the logic that is used to control such a system. This Propulsion Module is involved on any configuration anytime that safety key in enabled (Step 300) on the helm control 14 and the bus voltage is of at least 240 volt thereby allowing propulsion. Should either of these two states not be satisfied, propulsion may not be allowed or may be stopped (Step 302). The next box (Step 304) relates to stored maximum propulsion power limits of the system in each of three different configurations, namely electric only where power is limited to 3C or three time the nominal energy stored in the ESU 36, in this example approximately 100 kW, 3C plus generator 32 or single engine if operating in a multi-engine configuration and if all engines are operating the full power of all engines combined with the addition of the ESU 36 or the generator 32,34 depending on the elapse time. Upon verification that the OFF, AUTO and ON in not in the ON position (Step 306), since the ON position override all logic, has all engines operating (Step 328) and goes on to load following (Step 310). The next verification is the elapse time of the new load change, if there was one (Step 308). This leads into the actual load checking according to the engines stored efficiency mapping (Step 312). Once the load is determined and according to an internal efficiency map of all power producing devices (EMC 12), a simple to follow logic may start/stop the different devices depending on total load requirements and on the status of the OFF, AUTO and ON modes.

If the system loads are substantially constant, then the EMC 12 may determine if the system loads are less than the prime mover efficiency point (optimum ICE efficiency) minus approximately 20% (FIG. 8) or if the generator 32 is not operating (Step 312). If yes to either, then the EMC 12 may determine if the at least one prime mover 28 is operating (Step 314). If the at least one prime mover 28 is operating, the EMC 12 may shut down the at least one prime mover 28 (Step 316). In either of these two cases (Step 314) the system would revert to electric only operation, with or without the generator depending on the status of the ESU 36 following logic diagram 5. If the system loads are not less than the prime mover efficiency point minus approximately 20% or if the generator 32 is operating, then the EMC 12 may determine if the propulsion loads are approximately within the 20% above or below the prime mover efficiency point and the operating mode is AUTO (Step 318). If yes to both, the EMC may determine if two or more prime movers 28 are operating (Step 320). If two prime movers 28 are operating, then the EMC 12 may shut down one of the two prime movers 28, and in particular, the EMC 12 may shut down the prime mover 28 that has been for a longer period of time (Step 322) and allow the system 10 to continue to operate within its efficiency window (Step 310). If two prime movers 28 are not operating, the EMC 12 determines if one or no prime movers are operating (Step 324). If no prime movers 28 are operational, then the EMC 12 may start one of the prime movers 28, and in particular, the prime mover 28 with less hours of operation (Step 326) and allow the system 10 to continue to operate within its efficiency window (Step 310). It should be also noted that in a multi-prime-mover vessel, the engine started is always the one with the least number of operating hours and the one stopped is always the one with the most operating hours, this simple logic maintains a nice balance of operating hours on the engines thereby simplifying maintenance.

Continuing to refer to FIG. 7, in AUTO mode if propulsion load demands marginally rise above the optimum efficiency of the generator 32 for an extended period of time, the EMC 12 may start the prime mover 28 and drive the first propeller 18 directly and in turn generate power using the first electric motor 22. If power demands are less than 200 kW total, the generator 32 may shut down. In this embodiment, the prime mover 28 may provide up to 200 kW of power split between the first propeller 18 and the second propeller 20. This mode provides the highest level of efficiency as the prime mover 28 loads closely matched the optimum operating window (FIG. 8) by using the attached electric motor/generator combination. This also allows for effective propeller usage as the vessel never ends-up having a propeller water-mill with its associated drags. Should power demands exceed 200 kW, the EMC 12 may restart the generator 32 and combine all power sources to allow up to a combined 400 kW of propulsion power.

In another exemplary method of using at least two prime movers 28, each prime mover 28 may have an associated cooling system including a closed loop (not shown) and a cooling fluid, for example, water, to prevent overheating of each prime mover 28. In particular, both prime movers 28 may be in fluid communication with the same cooling loop (not shown) such that when one of the two prime movers 28 is idle or off, and the other prime mover 28 is operating, the idle or off prime mover 28 may be maintained an operative temperature which may decrease the warm-up time and thermal shock, and increase startup fuel efficiencies.

Furthermore, during startup of the prime mover internal combustion engine 28, the energy storage unit provides power to spin the electric motor 24, which further rotates the prime mover internal combustion engine 28 to an operating speed before fuel is provided to power the prime mover internal combustion engine 28. Additionally, when the clutch 50 coupled to the prime mover internal combustion engine 28 is in a closed position the electric motor 24 recharges the ESU 36, and wherein when the clutch 50 is in an open position, the electric motor 24 provides propulsion. Moreover, the energy management control unit 12 may synchronize the rotations per minute of the electric motor 24 and the rotations per minute of the prime mover internal combustion engine 28 such that clutch opening and closing can be done under optimum load and rpm thereby further increasing efficiencies.

Figure 8:
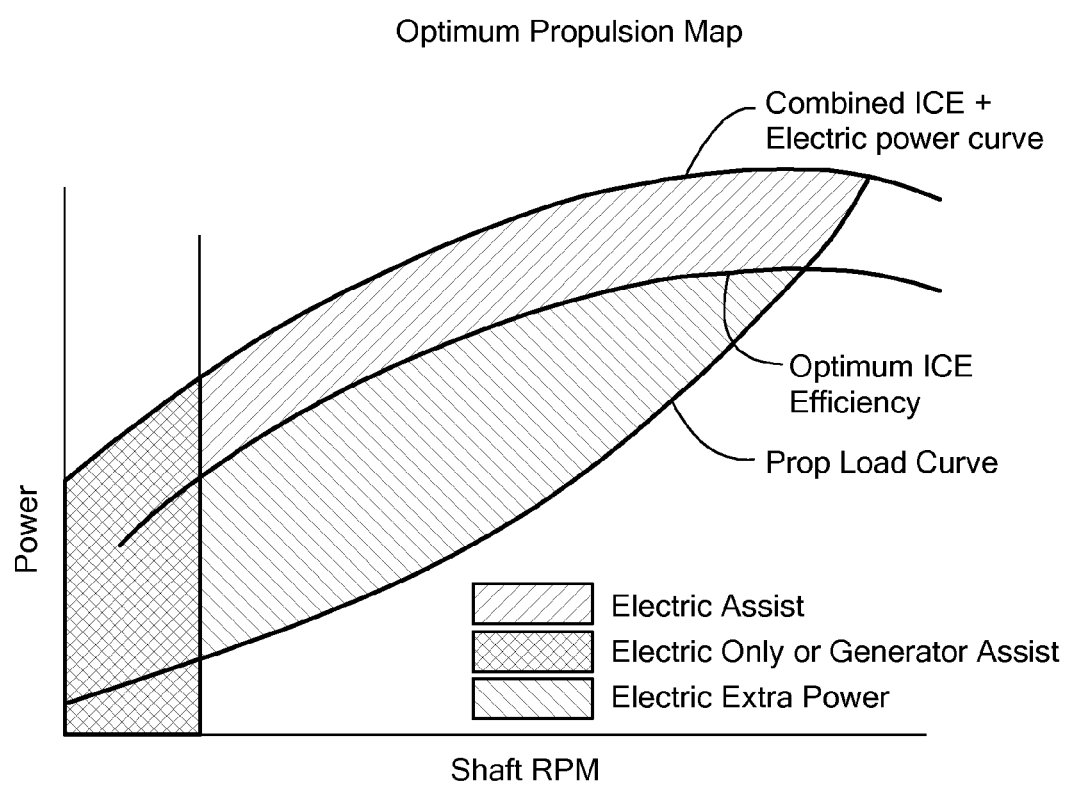
FIG. 8 is an exemplary graph showing the area of optimized operation of electric motor/generator and internal combustion engine in a combined serial and parallel hybrid system typical of the present invention.

Now referring to FIG. 8, which shows the area of utilization of the mixed propulsion (ICE and electric motor) in a parallel configuration. Usually in a well-designed parallel hybrid system, the electric motor is approximately 30% of the power of the ICE. Since electric motor have a much greater low speed torque than an ICE and ICE are extremely fuel inefficient at low power and low rpm, it is logical that the attached electric motor be the sole provider of propulsion when at low power. An electric motor that has approximately 30% of the power of an ICE also most likely has a higher low speed torque, so in a parallel system this allows for the elimination of the standard transmission and its mechanical losses, since the electric motor is able to handle the forward, neutral, reverse simply by logic. When, due to power requirements, the ICE is automatically started, the attached electric motor is then used as a generator when below the optimum ICE (Internal Combustion Engine) efficiency curve for a given rpm, with the aim to bring the efficiency of the ICE closer to the optimum 80-90% of load, always aiming for the lowest amount of fuel used per kilowatt produced. If power demands exceed the optimum ICE efficiency curve, then the attached electric motor is used to assist in propulsion with the aim of keeping the ICE at its best efficiency This is accomplished at low power by using strictly electric for all maneuvering, reverse and forward up to hull speed for limited time and when en route, optimizing the operation by making sure that the propellers (in a multi propeller installation) have equal thrust so has to avoid any drag caused by asymmetrical power utilization. The same logic being used when one or more ICE is running whether in propulsion or generation to always optimize its operation, by using the attached electric motor/generator loads and the rpm to maintain (in normal operation) optimum efficiency.

It will be appreciated by persons skilled in the art that the present invention is not limited to what has been particularly shown and described herein above. In addition, unless mention was made above to the contrary, it should be noted that all of the accompanying drawings are not to scale. A variety of modifications and variations are possible in light of the above teachings without departing from the scope and spirit of the invention, which is limited only by the following claims.

What is claimed is:

1. A hybrid energy management system for a marine vessel, the hybrid energy management system comprising: a human actuable input device, the human actuable input device selecting one of a plurality of operating modes; an energy storage unit, the energy storage unit having a corresponding charge level; a generator set, the generator selectively supplying at least one of house power, propulsion power and energy storage unit recharge power based at least in part on the selected one of the plurality of operating modes; a first electric motor, the electric motor operating in an electric generation mode to generate electric power and as motor in a propulsion mode to turn a first propeller; a first prime mover internal combustion engine; and a gear box connecting the first prime mover internal combustion engine, the first electric motor and the first propeller such that in at least one mode of operation the first prime mover internal combustion engine can drive the first propeller independent of the first electric motor and in at least a second mode of operation the first electric motor can drive the first propeller independent of the first prime mover internal combustion engine, the first prime mover internal combustion engine controllable to turn the first propeller and to drive the electric motor to generate the electric power when the electric motor is in the electric generation mode; and an energy management control unit, the energy management control unit having a processor controlling the operation of the first prime mover internal combustion engine, the generator and the first electric motor based at least in part on the selected operating mode, the energy storage unit charge level, a house load demand and a propulsion demand;

the hybrid energy management system further comprising a second prime mover internal combustion engine controllable by the energy management control unit to turn a second propeller and a cooling system, wherein the first prime mover internal combustion engine and the second prime mover internal combustion engine are each in fluid communication with the cooling system, and wherein when one of the first and second prime mover internal combustion engines is not operating, the cooling of at least one of the operating first and second prime mover internal combustion engines and generator set maintains an operative temperature of the inoperative one of the first and second prime mover internal combustion engines.

2. The system of claim 1, further including at least one of a wind generator and solar panels coupled to the marine vessel and providing energy to the energy storage unit.

3. The system of claim 1, wherein the plurality of operating modes includes a mode in which the first propeller is turned by power exclusively provided by the energy storage unit.

4. The system of claim 1, wherein the plurality of operating modes includes a mode in which the generator and the energy storage unit cooperate to provide power to the first propeller.

5. The system of claim 1, wherein the plurality of operating modes includes an energy mode in which the energy storage unit, first prime mover internal combustion engine, and the generator set cooperate to provide power to the first propeller.

6. The system of claim 1, further comprising a second electric motor corresponding to the second prime mover internal combustion engine, wherein when one of the first and second prime mover internal combustion engines is not operating, the one of the first and second propellers corresponding to the non-operating one of the first and second prime mover internal combustion engines is driven by the corresponding electric motor, the corresponding electric motor being powered by the operating one of the first and second prime mover internal combustion engine.

7. The system of claim 1, wherein the generator set includes a generator internal combustion engine, and wherein during startup of the generator internal combustion engine, the energy storage unit provides power to spin the electric motor, which further rotates the generator internal combustion engine to an operating speed before fuel is provided to power the generator internal combustion engine.

8. The system of claim 1, further comprising: a transmission; and a clutch coupled to the prime mover internal combustion engine, wherein during operation, the energy management control unit synchronizes the rotations per minute of the electric motor and the rotations per minute of the prime mover internal combustion engine before at least one of closing the clutch and engaging the transmission to join the electric motor and the prime mover internal combustion engine.

9. The system of claim 1, further comprising a clutch coupled to the prime mover internal combustion engine, and wherein when the clutch is in a closed position the electric motor performs one of recharging the battery and assisting in propulsion, and wherein when the clutch is in an open position, the electric motor performs one of providing propulsion and generating electricity.

* * * * *